UNITED STATES PATENT OFFICE.

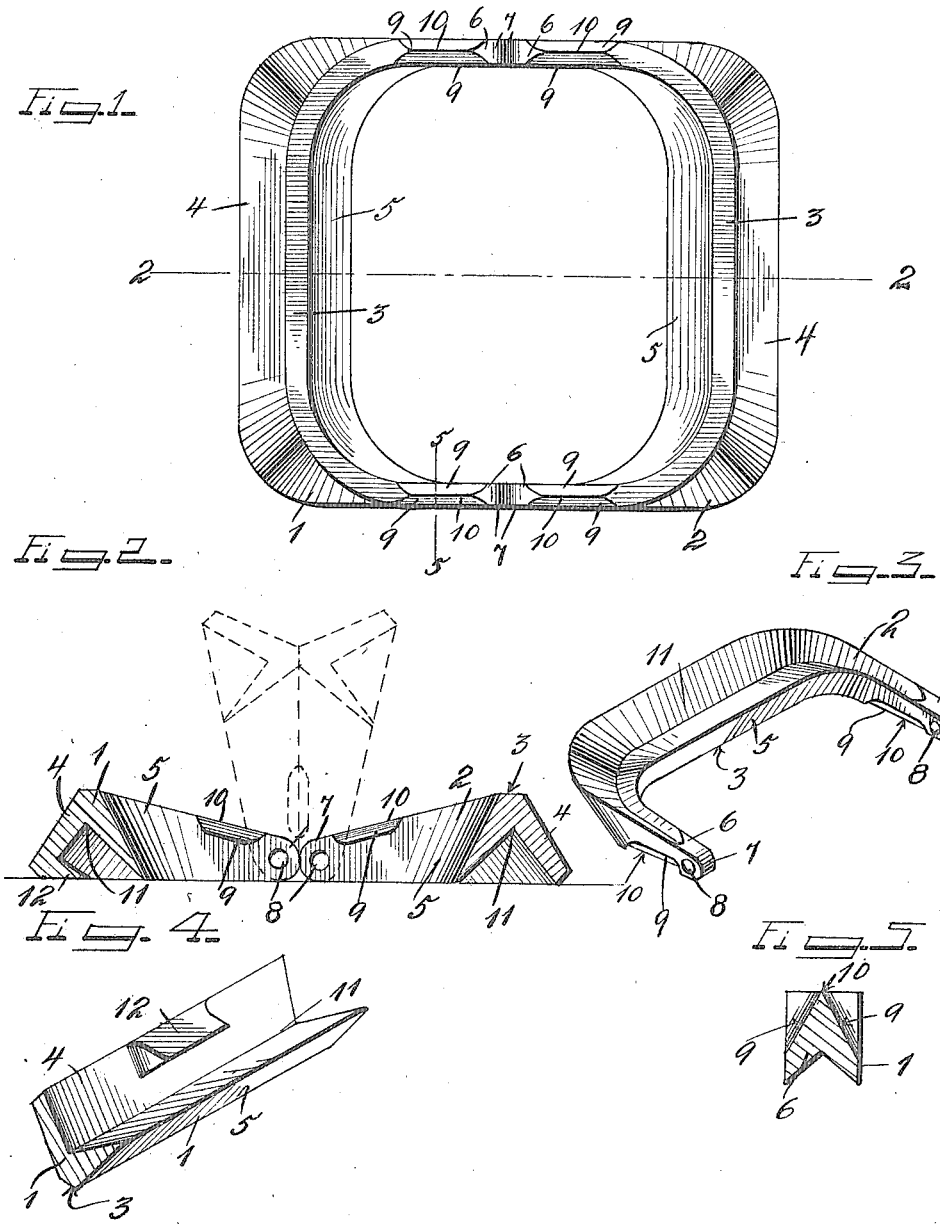

WYLIE D. KING, OF MEDINA, TEXAS.

JAWS FOR ANIMAL-TRAPS.

1,136,015.  Specification of Letters Patent.  Patented Apr. 20, 1915.

Application filed May 16, 1914. Serial No. 839,077.

*To all whom it may concern:*

Be it known that I, WYLIE D. KING, a citizen of the United States, residing at Medina, in the county of Bandera and State of Texas, have invented certain new and useful Improvements in Jaws for Animal-Traps, of which the following is a specification, reference being had therein to the accompanying drawing.

This invention relates to jaws for animal traps and has for its object the production of a jaw which is so formed as to catch the leg of an animal in such a manner as to prevent the animal having access to the portion of the leg which is caught and thereby prevent the animal from gnawing or severing the leg and freeing himself.

Another object of this invention is the production of a jaw or trap which is so constructed as to prevent an animal from bending his leg after the same has become caught by the trap and thereby breaking his leg which would facilitate his escape.

Another object of the invention is the production of a plurality of cutting edges adjacent the pivot portions of the jaws for dislodging twigs, branches, and any other refuse which would prevent the jaws from swinging to a closed position for catching an animal.

With these and other objects in view this invention consists in general of certain novel combinations, constructions, and arrangement of parts as will be hereinafter fully described and specifically claimed.

In the accompanying drawing:—Figure 1 is a top plan view of a plurality of jaws constructed in accordance with this invention as they would appear in an open or set position. Fig. 2 is a section taken on the line 2—2 of Fig. 1. Fig. 3 is a detail inverted perspective view of a jaw constructed in accordance with this invention. Fig. 4 is a fragmentary perspective view of a portion of one of the jaws. Fig. 5 is a section taken on the line 5—5 of Fig. 1.

Referring to the accompanying drawing by numerals 1 and 2 designate in general a plurality of jaws which are adapted to be used in connection with any suitable operating means such as are used in connection with spring jaw traps. It is therefore not deemed necessary to disclose any specific operating means in this case by which the jaws can be held in a set position since any desirable spring-actuating means may be employed in combination with the invention. Each jaw comprises a substantially V-shaped body in a cross section as clearly disclosed in Fig. 2. By forming the jaws in this manner there will be provided a comparatively wide, flat rib 3, which is formed upon the converging portions of the slanting sides 4 and 5. These sides 4 and 5 and the rib 3 extend to form at each end a reduced neck 6, terminating in a bearing 7, through which the eye 8 is formed. Each neck 6 is provided upon its inner edge with beveled portions 9, to form a cutting edge 10. It is to be noted however, that this cutting edge 10 is formed adjacent the bearing 7 at each end of the jaw and does not extend around the rib 3 and therefore will not in any manner strike upon or engage the leg or the portion of an animal which is caught by the trap.

By referring to Fig. 3 it will be seen that the construction of the rib 3 and the sides 4 and 5 constitutes a hollow under surface 11 for each jaw thereby forming each jaw of a comparatively light structure which will allow the same to easily operate and perform the functions above set forth. It will also be seen by referring to Figs. 2 and 4 that the jaw 1 is provided with a lug 12 extending into the cut-out portion 11 and to this lug any suitable catch may be secured for holding the jaws in an open set position. However, it will be seen that since this lug is formed upon the lower portion of the jaw, the catch which would be secured thereto will not in any way interfere with the operation of the jaws. When these jaws are in use they will assume the position disclosed in Figs. 1 and 2 when in a set position. When, however, the trap is swung the two jaws will swing to a closed position as indicated in Fig. 2 in dotted lines. As the jaws swing to a closed position, any refuse which might be positioned upon the jaws or the trap for the purpose of concealing the same, or which happened to be positioned thereon accidentally would be cut by the cutting edge 10 while the main portion of each jaw would allow the refuse to easily slide from engagement therewith and therefore the jaws could easily swing to a closed position. When the leg of an animal has been caught between the ribs 3, the animal cannot have access thereto at the portion which is caught since the sides 4 would hold the animal's head away from the caught portion at a sufficient distance to prevent him gnawing his leg and thus escaping. Since the sides 4 and 5 of each jaw converge toward their inner or upper portions, it will be impossible for the animal to twist his leg acutely over the edge of the jaw which would cause the leg to break and therefore the animal will be held securely without danger of freeing himself as is the case with the ordinary jaws now in use.

From the foregoing description it will be seen that a simple and efficient device has been produced which will efficiently hold an animal after the same has been caught and will prevent the animal from severing or breaking his leg which would allow him to escape and which is also provided with a simple and efficient means for allowing the device to assume a closed position.

What I claim is:—

A device of the class described comprising a plurality of jaws, each jaw comprising a plurality of slanting sides, said sides converging toward their inner edges and terminating evenly to form a substantially wide, flat rib, said sides and rib extending to form angularly extending necks, terminating in bearing portions, each neck provided with a beveled portion adjacent the bearing portion, thereby forming cutting edges, said jaws being adapted to be swung so as to allow the ribs to swing toward each other for catching an animal, said slanting sides being adapted to protect the caught portion of an animal, thereby preventing the animal from severing the leg which is caught and freeing himself, said cutting edges being adapted to dislodge any refuse which might be carried thereby.

In testimony whereof I hereunto affix my signature in presence of two witnesses.

WYLIE D. KING.

Witnesses:
S. J. ADAMS,
J. C. COLLINS, Jr.

Copies of this patent may be obtained for five cents each, by addressing the "Commissioner of Patents, Washington, D. C."